Feb. 3, 1970   J. HALLER   3,492,696
PRECISION POWER-MOVED DIE TABLE FOR PRESSES
Filed Aug. 14, 1967   2 Sheets-Sheet 1
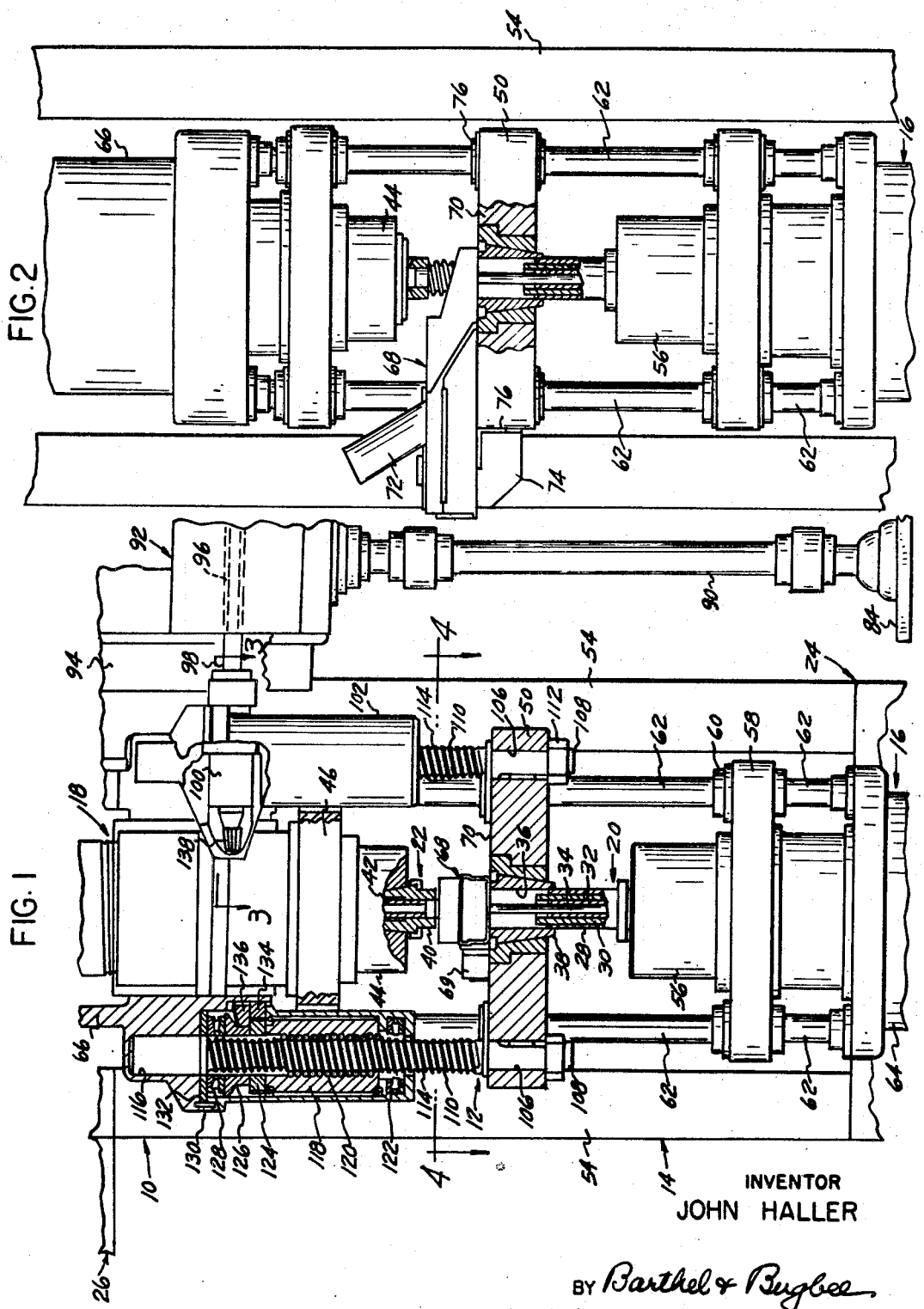
INVENTOR
JOHN HALLER
BY Barthel & Bugbee
ATTORNEYS

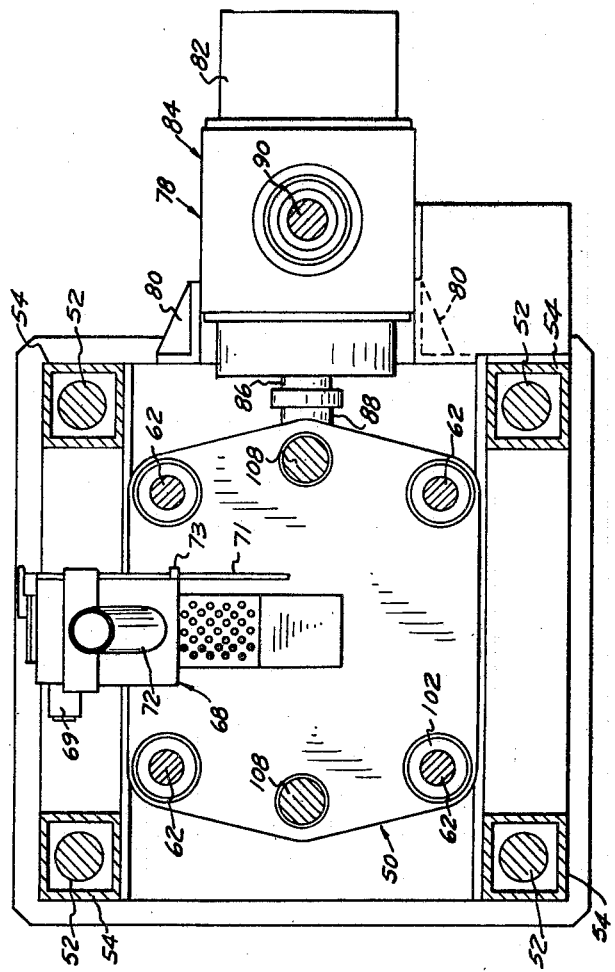
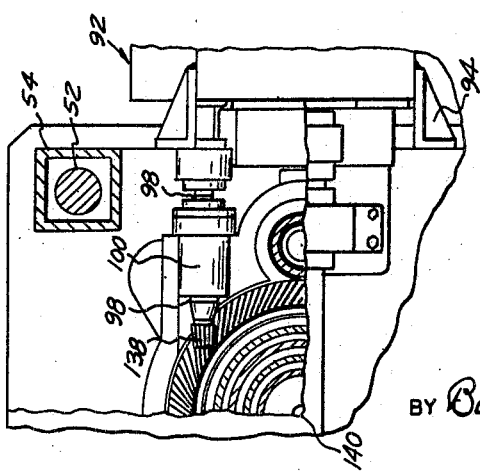

United States Patent Office 3,492,696
Patented Feb. 3, 1970

3,492,696
PRECISION POWER-MOVED DIE TABLE
FOR PRESSES
John Haller, 18500 Sheldon Road,
Northville, Mich. 48167
Filed Aug. 14, 1967, Ser. No. 660,309
Int. Cl. B29c 3/00
U.S. Cl. 18—16.5
9 Claims

ABSTRACT OF THE DISCLOSURE

A power-driven vertically-movable die table assembly for presses, especially powdered material briquetting presses, has the die table vertically slidably mounted upon parallel guide rods and carries a pair of nonrotatable screwshafts meshing with power-driven rotary nuts which are restrained against vetrical movement and which are simultaneously rotated by a ring gear in one direction or the other to raise or lower the screw shafts and die table in a precisely controlled manner. The ring gear, which is coaxial with the main axis of the press, is driven by a pinion which in turn is operatively connected through magnetic clutches or the like to a driving motor, the magnetic clutches being associated with reverse gearing.

ADVANTAGES OF THE INVENTION

This precisely-controlled power-driven die table assembly enables the die table to be moved codirectionally with the pressing plunger or plungers so that the punch or punches and die exert a controlled slippage on the powdered material being compressed, thereby altering the wall friction in the die cavity and enabling the density of the compressed material to be precisely maintained or obtained in the exact location where it is desired. The same motion may be reversed to reversely strip the press briquette.

In the drawings:

FIGURE 1 is a fragmentary central vertical section, partly in front elevation, of a powdered material briquetting press equipped with a power-driven vertically-movable die table assembly, certain portions being broken away in central vertical section and the driving pinion shown in the upper right-hand corner in a plane behind the central plane;

FIGURE 2 is a fragmentary side elevation of the press and die table assembly shown in FIGURE 1;

FIGURE 3 is a fragmentary horizontal section taken along the line 3—3 in FIGURE 1, showing the hypoid gear drive for the rotary nuts of the die table assembly; and FIGURE 4 is a horizontal section, with the die table in top plan view, taken along the line 4—4 in FIGURE 1.

Referring to the drawings in detail, FIGURES 1 and 2 show the central portion of a powdered-material briquetting press, generally designated 10, the upper and lower portions being broken away and omitted to permit the showing of the details of the central portion on an enlarged scale. The press 10 is equipped with a power-driven vertically-movable die table assembly, generally designated 12, according to the present invention, the omitted details of the press at top and bottom in FIGURES 1 and 2 being beyond the scope of the present invention. The press 10 itself, aside from the movable die table assembly 12, may be of the type shown in my copending application Ser. No. 507,090 filed Nov. 10, 1965, for "Powdered Material Briquetting Press" which on Nov. 21, 1967, was issued as United States Patent No. 3,353,215. For the purposes of the present invention, it will suffice to state that the press 10 as disclosed in the patent just mentioned includes a hollow press frame formation 14 with lower and upper actuating mechanism assemblies 16 and 18 respectively for operating the lower and upper powdered material compacting units 20 and 22, respectively. The press frame formation 14 includes a hollow base structure 24 and hollow head structure 26. The former contains power-driven coaxial hollow cylindrical screws (not shown) which actuate lower coaxial tubular punches 28, 30 and 32 and a core rod 34 to move them upward and downward relatively to a bore 36 forming a die cavity in a die 38. The latter also contains power-driven coaxial hollow cylindrical screws (not shown) which move upward and downward tubular coaxial upper punches 40 and 42 into and out of the die cavity 36 with the core rod 34 telescoping with the tubular upper inner punch 42 in the manner described in the above-identified Haller patent. The outer upper punch 40 is mounted in a cup-shaped support 44 which in turn is secured to an upper platen 46 moved upward and downward by the outermost of the upper hollow cylindrical screws (not shown), whereas the lower die 38 is mounted in an annular adapter sleeve 48 in a die table 50 which forms the lowermost part of the power-driven vertically-movable die table assembly 12. The press frame formation 14 is provided at its four corners (FIGURES 3 and 4) with four parallel vertical strain rods 52 located within frame uprights 54 of hollow square cross-section which interconnect the hollow base structure 24 and the hollow head structure 26 (FIGURES 1 and 2) as more fully set forth in the above-identified Haller patent.

The outermost tubular punch 28 of the lower powdered material compacting unit 20 is mounted on an inverted cup-shaped support 56 which, like the corresponding upper support 44, is mounted upon and connected to a lower platen 58. The lower and upper platens 58 and 46 are bored at their corners and provided with bearing bushings 60 which slidably engage four guide rods 62. The lower and upper mechanism assemblies 16 and 18 are enclosed in oppositely-facing flanged housings 64 and 66 respectively, their flanges being drilled to receive the flanged lower and upper ends of the guide rods 62. The die table 50 is equipped with a filling shoe 68 which is slidable into and out of registry with the die cavity 36 over the top surface 70 of the die table 50 by means of an electric motor 69 and suitable mechanism (not shown) including a screw shaft 71 and nut 73 (FIGURE 4). Powdered material is supplied to the filling shoe 68 through an upwardly and outwardly inclined inlet pipe 72 (FIGURE 2). The outer end of the filling shoe 68 is slidably supported upon a bracket 74 which in turn is secured to the die table 50 by an angle member 76 (FIGURE 2). The filling shoe 68 is conventional and its details, including the mechanism for moving it back and forth, are beyond the scope of the present invention.

The lower and upper mechanism assemblies 16 and 18 are driven by a power unit 78 secured by angle brackets 80 to the hollow base structure 24. The power unit 78 includes an electric driving motor 82 (FIGURE 4) which drives a reversing gear box 84 containing magnetic clutches and gearing (not shown) by which rotation may be imparted in opposite directions to the output shaft 86 thereof. The latter is coupled to the input shaft 88 of the lower mechanism assembly 16, whereas a vertical shaft 90 proceeds from the lower gear box 84 upward to a similar upper gear box 92 connected by angle brackets 94 to the hollow head structure 26. The upper actuating mechanism assembly 18 is driven from the upper gear box 92 in a manner described in the above-mentioned Haller Patent No. 3,353,215 issued Nov. 21, 1967. The upper gear box 92 also has an output shaft 96 which is coupled to and drives the input shaft 98 of the vertically-movable die table assembly 12. The input shaft 98 is rotatably supported in bearings (not shown) in a bearing bracket 100 (FIGURES 1 and 3) which is secured to one side of a vertical cylindrical housing 102 and this in turn depends from and is secured to the upper flanged housing 66.

The die table 50 is bored at its four corners and provided with bearing bushings 104 which slidably engage the guide rods 62 as the die table 50 moves upward and downward in a manner described below in connection with the operation of the invention. The die table 50 (FIGURE 4) is bored at 106 midway between the front and rear guide rods 62 and slightly outward from the plane of centers thereof to receive the threaded lower end portions 108 of parallel non-rotatable screw shafts 110 (FIGURE 1). The screw shafts 110 are shouldered at their junctions with the top surface 70 and keyed into the bores 106 to prevent rotation of the screw shafts 110 relatively to the die table 50 and carry nuts 112 threaded onto their lower end portions 108 to hold the screw shafts 110 unitarily and immovably in assembly with the die table 50, except as the die table 50 itself moves upward or downward.

The screw shafts 110 are threaded as at 114 throughout the major parts of their lengths and pass upward into the housings 102 to the upper ends thereof. The flanges of the flanged upper housing 66 are provided with sockets 116 (FIGURE 1) which provide clearance for the upper portions of the screw shafts 110 when the die table 50 is raised to its uppermost position. Threaded into each screw shaft 110, which is preferably of the ball-grooved lead screw type, is an elongated ball groove nut 118 (FIGURE 1) which is drivingly connected to the screw shaft 110 by multiple balls 120 seated in the opposing helical grooves of the threaded portion 114 and nut 118. The lower end of each nut 118 bears against a tapered roller thrust bearing 122 while drivingly secured in any suitable manner, as by bolts (not shown) to the upper end thereof is a spur gear 124. Disposed immediately above each spur gear 124 in abutting relationship therewith is a flanged annular thrust collar 126 which in turn bears against a tapered roller thrust bearing 128, the upper side of which bears against a wear plate 130. The wear plate 130 is seated in a socket or recess 132 in the flange of the upper housing 66.

Meshing with the spur gear 124 is a spur ring gear 134 (FIGURE 1) coaxial with the central axis of the press 10, i.e., with the lower and upper compacting units 20 and 22. Bolted or otherwise drivingly secured to the ring spur gear 134 is a hypoid ring bevel gear 136 which is likewise coaxial with the central axis of the press 10. Meshing with the hypoid bevel gear 136 is a hypoid bevel pinion 38 mounted on and drivingly connected to the inner end of the input shaft 98 of the vertically-movable die table assembly 12 (FIGURES 1 and 3). From FIGURE 3 it will be seen that the axis of the shaft 98 does not intersect the central axis 140 of the press but is tangential to a circle centered on the axis 140.

OPERATION

In the operation of the power-driven vertically-movable die table assembly 12, let it be assumed that the power input shaft 98 thereof within the gear box 92 is provided with interchangeable speed-varying gearing by which the relative speed of the die table power input shaft 98 can be varied for a given speed of the vertical shaft 90. Such interchangeable gearing is conventional and is widely used in lathes, milling machines and other machine tools for shaft speed variation. Let it be assumed that the filling shoe 68 has been filled with powdered material, such as powdered metal or powdered nylon, and its motor 69 has been so connected into the timing circuit of the press 10 as to rotate the screwshaft 71 within the nut 73 (FIGURE 4) fixedly secured to the filling shoe 68 so as to move the filling shoe 68 over the upper end of the die cavity 36 (FIGURE 2) whereupon powdered material drops into the die cavity 36 and fills it. The filling shoe 68 is then retracted to its outermost position and the main driving motor 82 then caused to rotate the shafts 86 and 90 to cause the upper and lower compacting units 20 and 22 to move toward one another. The lower compacting unit 20 halts when its tubular punches 28, 30 and 32 are at a suitable level within the die cavity 36 and the top of the core rod 34 is in the same plane as the top surface 70 of the die table 50. The parts are now in the positions of FIGURES 1 and 2 and the continued downward motion of the upper compacting unit 22 causes the powdered metal or other powdered material to be compressed within the die cavity 36 against the punches of the lower compacting unit 20.

Meanwhile, however, if the wall friction between the powdered material being compressed and the die cavity 36 is to be lessened, the die table 50 is caused to move downward during the pressing operation. This is accomplished by rotating the input shaft 98 to cause the hypoid pinion 138 to rotate the hypoid ring gear 136 and spur ring gear 134, the latter of which transfers such rotation to the two spur gears 124 and the latter in turn rotates the ball nuts 118. Since the latter are held at a fixed level by the thrust bearings 122 and 128 while rotating, the screwshafts 110 move downward, carrying with them the die table 50. The remainder of the pressing operation is carried out in the usual manner.

If, on the other hand, it is desired to increase the wall friction within the die cavity 36, the die table 50 is moved downward in the same manner but at a slower speed than the upper compacting unit 22. In either event, after the powdered material has been compressed to the desired extent, the upper compacting unit is retracted upward, whereupon the resulting briquette can be ejected in either of two ways. In the first way, by direct stripping, the lower compacting unit 20 is moved upward, except for the core rod 34, until the bottom of the briquette is pushed upward to the level of the top surface 70 of the die table 50, when it can be removed. In the second way, by reverse stripping, the lower compacting unit 20 is maintained in a fixed position, while the die table 50 is caused to move still further downward until the briquette has been freed from the die cavity 36 when the top surface 70 of the die table 50 has moved downward to the level of the top of the uppermost lower punch 30.

I claim:
1. The combination with a powdered material briquetting press having a press frame formation with power-operated upper and lower pressing plunger means mounted thereon for movement upward and downward toward and away from one another and adapted to receive upper and lower punches respectively, of a power-driven screw-actuated vertically-movable precision die table installation, comprising
 a plurality of vertical guide members connected in spaced parallel relationship to the press frame formation,
 a die table mounted for guided sliding travel vertically along said guide members,
 a plurality of screw shaft elements operatively connected to said table in spaced parallel relationship to said guide members,
 a nut element threadedly engaging each screw shaft element,
  one of said elements of each pair of threadedly engaging elements being stationarily mounted and the other element of each said pair being rotatably mounted,
 and power-driven mechanism drivingly connected to each rotatably-mounted element for effecting relative rotation between said elements of each said pair for moving said die table vertically relatively to said guide members.
2. The combination of claim 1, wherein said screw shaft elements are non-rotatably fixed to said die table, wherein said nut elements are so rotatably mounted, and wherein said power-driven mechanism is drivingly and rotatingly connected to said nut elements.

3. The combination of claim 2, wherein the lower portions of said screw shaft elements are fixedly connected to said die table.

4. The combination of claim 2, wherein said power-driven mechanism includes a nut-rotating gear drivingly connected to each nut element, a rotary ring gear meshing with each nut-rotating gear and rotatably mounted on the press frame formation, and power-driven means rotatingly connected to said ring gear.

5. The combination of claim 4, wherein said ring gear is mounted for rotation surrounding and coaxial with one of the plunger means.

6. The combination of claim 4, wherein said ring gear is mounted for rotation surrounding and coaxial with the upper plunger means.

7. The combination of claim 4, wherein said ring gear is a spur gear, and wherein said power-driven means includes a bevel ring gear drivingly connected to and coaxial with said spur ring gear, and a power-driven bevel pinion meshing with said bevel ring gear.

8. The combination of claim 7, wherein said bevel ring gear is a hypoid ring gear and wherein said bevel pinion is a hypoid pinion disposed with its axis spaced radially away from the axis of said hypoid ring gear.

9. The combination of claim 4, wherein thrust bearing assemblies are disposed in encircling relationship to said screw shafts between the opposite ends of said nut elements and said press frame formation.

References Cited

UNITED STATES PATENTS

| | | | |
|---|---|---|---|
| 1,851,138 | 3/1932 | Smith. | |
| 2,348,197 | 5/1944 | Ernst. | |
| 2,498,264 | 2/1950 | Goldhard. | |
| 2,509,783 | 5/1950 | Richardson | 18—16.7 |
| 2,651,180 | 9/1953 | Haller. | |
| 1,952,241 | 3/1934 | Eckert. | |
| 2,825,092 | 3/1958 | Hatch et al. | 18—16.7 |
| 3,093,863 | 6/1963 | Ehlert. | |
| 3,191,235 | 6/1965 | Rougement. | |
| 3,353,215 | 11/1967 | Haller | 18—16.7 |
| 3,154,812 | 11/1964 | Haller | 18—16.7 |
| 3,191,232 | 6/1965 | Haller | 18—16.7 |

J. HOWARD FLINT, Jr., Primary Examiner

U.S. Cl. X.R.

18—30, 16.7